(12) United States Patent
Thomas et al.

(10) Patent No.: US 9,436,493 B1
(45) Date of Patent: Sep. 6, 2016

(54) DISTRIBUTED COMPUTING ENVIRONMENT SOFTWARE CONFIGURATION

(75) Inventors: Nathan Thomas, Seattle, WA (US); Max Joseph Spevack, Seattle, WA (US); Nathan H. Blackham, Shoreline, WA (US); Matthew S. Wilson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 284 days.

(21) Appl. No.: 13/536,571

(22) Filed: Jun. 28, 2012

(51) Int. Cl.
*G06F 9/455* (2006.01)
*G06F 9/445* (2006.01)
*G06F 9/44* (2006.01)
*G06F 9/50* (2006.01)
*G06F 21/62* (2013.01)

(52) U.S. Cl.
CPC ......... *G06F 9/45558* (2013.01); *G06F 9/4401* (2013.01); *G06F 9/5088* (2013.01); *G06F 21/6218* (2013.01); *G06F 9/45533* (2013.01)

(58) Field of Classification Search
CPC .... G06F 8/63; G06F 9/45558; G06F 9/5077; G06F 9/45533; G06F 2009/45562; G06F 8/38; G06F 9/45541; G06F 9/455; G06F 9/50; G06F 9/505; G06F 9/4401; G06F 9/4406; G06F 9/5016; G06F 9/5088; G06F 21/6218; G06F 21/51
See application file for complete search history.

(56) References Cited

U.S. PATENT DOCUMENTS

| | | | | |
|---|---|---|---|---|
| 7,433,951 B1* | 10/2008 | Waldspurger | ......... | G06F 9/5016 709/223 |
| 7,577,686 B1* | 8/2009 | Larkin | ................ | G06F 9/45537 |
| 7,577,722 B1* | 8/2009 | Khandekar | ......... | G06F 9/45558 709/220 |
| 8,230,069 B2* | 7/2012 | Korupolu | ............ | H04L 67/1097 709/226 |
| 8,255,484 B2* | 8/2012 | Khandekar | ......... | G06F 9/45558 709/203 |
| 8,713,202 B2* | 4/2014 | Droux | .................... | H04L 12/66 709/220 |
| 2003/0014621 A1* | 1/2003 | French | .................. | G06F 9/4416 713/2 |
| 2004/0166834 A1* | 8/2004 | Omar et al. | ............... | 455/414.1 |
| 2006/0136653 A1* | 6/2006 | Traut | .................... | G06F 9/4406 711/6 |
| 2007/0139422 A1* | 6/2007 | Kong et al. | ................... | 710/316 |
| 2007/0139423 A1* | 6/2007 | Kong | .................... | G09G 5/363 345/502 |
| 2007/0168478 A1* | 7/2007 | Crosbie | ..................... | G06F 8/63 709/221 |
| 2007/0180447 A1* | 8/2007 | Mazzaferri | ........... | G06F 3/1415 718/1 |
| 2007/0250833 A1* | 10/2007 | Araujo | ................ | G06F 21/6218 718/1 |
| 2008/0271016 A1* | 10/2008 | Chess | ...................... | G06F 8/63 718/1 |

(Continued)

OTHER PUBLICATIONS

Ishtiaq Ali et al., Virtual Machines and Networks-Installation, Performance, Study, Advantages and Virtualization Options , Jan. 2011, vol. 3 No. 1, [Retrieved on May 2, 2016]. Retrieved from the internet: <URL: https://arxiv.org/ftp/arxiv/papers/1105/1105.0061. pdf> 15 Pages (1-15).*

(Continued)

*Primary Examiner* — Thuy Dao
*Assistant Examiner* — Anibal Rivera
(74) *Attorney, Agent, or Firm* — Sutherland Asbill & Brennan LLP

(57) ABSTRACT

Certain embodiments herein relate to configuring software in a virtual machine instance ("instance") to optimally utilize computing resources that are available for implementation of the software. The software, such as operating systems and software applications, may be configured based on resource parameters associated with the instance. Such resource parameters may include information associated with capacities of the available computing resources.

26 Claims, 6 Drawing Sheets

(56) References Cited

U.S. PATENT DOCUMENTS

| | | | | |
|---|---|---|---|---|
| 2009/0083734 A1* | 3/2009 | Hotra | G06F 21/51 | 718/1 |
| 2009/0089780 A1* | 4/2009 | Johnson | G06F 9/455 | 718/1 |
| 2009/0138670 A1* | 5/2009 | Mutlu | G06F 13/1663 | 711/167 |
| 2009/0228589 A1* | 9/2009 | Korupolu | H04L 67/1097 | 709/226 |
| 2009/0282404 A1* | 11/2009 | Khandekar | G06F 9/45558 | 718/1 |
| 2009/0293056 A1* | 11/2009 | Ferris | G06F 9/5077 | 718/1 |
| 2009/0300607 A1* | 12/2009 | Ferris | G06F 9/45558 | 718/1 |
| 2010/0023940 A1* | 1/2010 | Iwamatsu | G06F 1/3203 | 718/1 |
| 2010/0077391 A1* | 3/2010 | Domsch | G06F 9/45541 | 717/174 |
| 2010/0162257 A1* | 6/2010 | Hiltunen | G06F 9/50 | 718/104 |
| 2010/0262722 A1* | 10/2010 | Vauthier | G06F 3/14 | 710/8 |
| 2010/0293544 A1* | 11/2010 | Wilson | G06F 9/4401 | 718/1 |
| 2011/0078679 A1* | 3/2011 | Bozek | G06F 9/455 | 718/1 |
| 2011/0154327 A1* | 6/2011 | Kozat | G06F 9/505 | 718/1 |
| 2012/0209945 A1* | 8/2012 | Chandrasekhar et al. | | 709/217 |
| 2012/0303923 A1* | 11/2012 | Behera | G06F 9/455 | 711/170 |
| 2012/0311571 A1* | 12/2012 | Morgan | G06F 11/3003 | 718/1 |
| 2013/0139155 A1* | 5/2013 | Shah | G06F 9/45558 | 718/1 |
| 2013/0159891 A1* | 6/2013 | Farrell | G06F 8/38 | 715/762 |
| 2013/0174144 A1* | 7/2013 | Cheng | G06F 9/45558 | 718/1 |
| 2013/0305243 A1* | 11/2013 | Hiki | G06F 9/5077 | 718/1 |
| 2013/0326505 A1* | 12/2013 | Shah | G06F 9/45558 | 718/1 |
| 2013/0326511 A1* | 12/2013 | Shah | G06F 9/45558 | 718/1 |
| 2014/0019961 A1* | 1/2014 | Neuse | G06F 9/5088 | 718/1 |
| 2014/0019965 A1* | 1/2014 | Neuse | G06F 9/45533 | 718/1 |
| 2014/0156960 A1* | 6/2014 | Simoncelli | G06F 21/6218 | 711/163 |

OTHER PUBLICATIONS

Jia Rao et al., VCONF: A Reinforcement Learning Approach to Virtual Machines Auto-configuration, Jun. 2009 ACM, [Retrieved on May 2, 2016]. Retrieved from the internet: <URL: http://delivery.acm.org/10.1145/1560000/1555263/p137-rao.pdf> 10 Pages (137-146).*

* cited by examiner

DISTRIBUTED COMPUTING ENVIRONMENT SOFTWARE CONFIGURATION

BACKGROUND

Service providers may offer distributed computing environments. These computing environments may include a number of computing resources that are made available over networks such as the Internet and accessed through services, such as Web services. Typically when these resources are allocated to run workloads for users, the software associated with the user (i.e., operating systems or applications), may not be tailored to run on the allocated resources. This may lead to less than optimal performance for the users and the misallocation of resources within the distributed computing environment.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
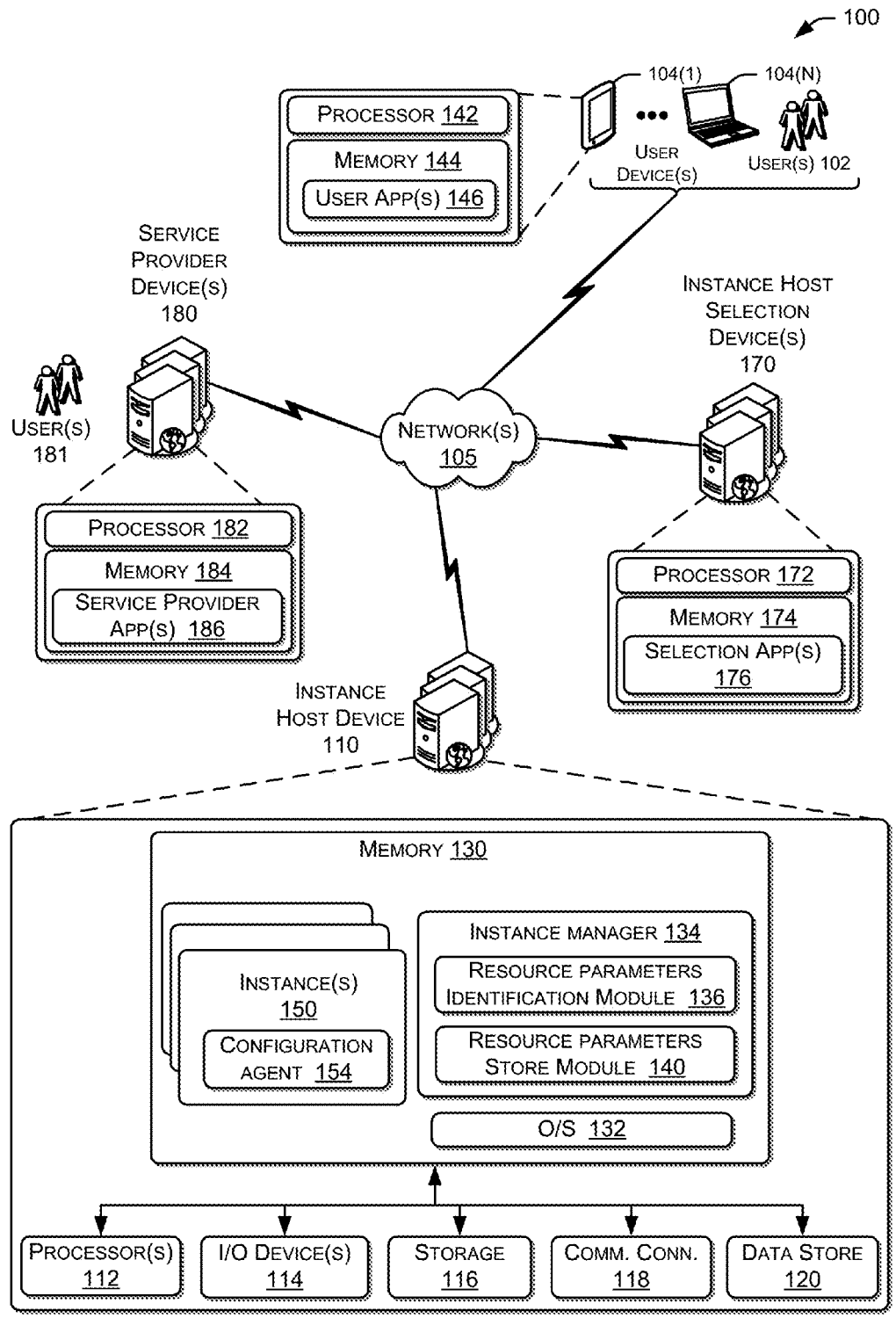
FIG. 1 illustrates a block diagram of an example computing environment for configuring software according to its execution environment, according to one embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Illustrative embodiments herein are directed to, among other things, configuring software for optimized performance in a distributed computing environment. Software, such as operating systems ("OSs") and software applications, may be configured such to take advantage of available computing resources. For example, an OS or application could enable features when additional resources are available or, alternatively, minimize its features or performance when less powerful computing resources are available. Certain embodiments herein relate to such software configuring itself based at least in part on the computing resources available to the software. For example, an operating system may configure itself and/or be configured by limiting the maximum number of concurrent web connections that may be received by a web server, upon detecting that adequate computing resources are not available. The same operating system, however, may configure itself and/or be configured by increasing the number of maximum concurrent web connections that may be received by a web server, upon detecting that adequate computing resources are available. In this way, software may perform optimally based on computing resources available to the software. According to certain embodiments herein, the software may perform such configurations without a user's assistance.

An example of software optimization as described herein may be as follows. A customer may request a certain amount of computing capacity for implementing a virtual machine running a web server from a service provider. In response to the request, the service provider may request a certain amount of processing power, memory, and hard disk space to run the virtual machine for the customer. To make it easier for service providers to manage computing capacities, categories of computing capacities may exist. For example, a customer may request a "small," "medium," or "large" amount of computing capacity and the service provider will locate a server within the distributed computing environment to host the requested amount of capacity. After the service provider selects a server, it can launch a virtual machine instance (or "instance"), which may include an operating system and the web server software. The operating system and web server may require tuning or configuring so that they run according to allocated computing resources of the server. As discussed above, using too few of the available computing resources may represent inefficiency or wasted opportunities to provide content to users, whereas using too many resources may result in a poor user experience in the form of slow delivery of content, system errors, or even outages.

Software optimization according to the present disclosure may solve these problems. In particular, software, such as the operating system and web server in the present example, may configure itself or be configured based on information provided by the service provider. Such optimization may occur as follows. In a specific example, when the instance is created, an operating system in the instance may begin to configure itself. For example, the operating system may detect that it is running in a "large" instance because the operating system may analyze the hardware allocated to it by a virtualization manager running on a server and/or because an agent running in the virtual machine exposes information that indicates the size of the instance to the OS. Because it is running in a "large" instance type, the operating system may take advantage of having relatively more computing resources. For example, the operating system may configure itself to allow an increased number of maximum allowable concurrent connections to the web server Similar to the operating system, the web server may also tune or configure itself based on the computing resources available in the large instance. The web server may, for example, activate a feature that may stream real-time video content to end-users of the customer. Streaming real-time video content may be a CPU-intensive process that may only be available for "large" instances or greater. Thus, upon detecting that it is running in a large instance, the web server may activate such a CPU-intensive feature. Notably, the web server (and the operating system) may not have configured themselves to provide such enhancements were they running in a "small" instance.

Software optimization as described herein may have numerous benefits, some of which may include improved efficiency and productivity gains for customers in the way that their software may be preconfigured to take advantage of available resources, or put another way, to constrain itself to available computing resources, which may result in a more enriched and reliable experience for a service provider's end users.

As described, physical computing resources available for implementing software may be represented virtually by associating the software with a virtual machine instance ("instance"), such as in a distributed computing environment. As used herein, a "virtual machine instance" or "instance" may be referred to as a software implementation of a machine, such as a computer, that executes computer programs like a physical machine. There may be various types of instances, each of which may include different information associated with computing resources that may be utilized to implement the software, referred to herein as resource parameters. Such information may be used to configure software, in certain embodiments herein. In so doing, the software may be optimized for utilization of the computing resources. In association with using a distributed computing environment, a user may request an instance that may include software, such as an operating system and/or one or more software applications. The instance may represent a certain capacity or portion of the available computing resources as requested by a user for implementing the software. Such capacity of resources may define an execution environment for the software. In certain embodiments, a user may request various amounts of such capacities by requesting a type of instance, in which each type of instance may correspond to a certain capacity of the computing resources. Thus, a different execution environment may exist for different types of instances, based on a user's needs, in one example.

An instance may be hosted by a server computer in a distributed computing environment of a service provider. In so doing, the server computer may perform a number of functions. For example, the server computer may identify resource parameters associated with a type of instance requested by a user. Such resource parameters may provide information associated with the instance's execution environment. For example, the resource parameters may specify a capacity of CPU, RAM, hard disk, or other hardware devices that may be utilized by software associated with an instance. The resource parameters may include predetermined information associated with computing information in a distributed computing environment, as well as real-time information obtained by a server computer hosting the instance.

The instance, including its operating system and software applications, may utilize the resource parameters to optimize its behavior or performance. In other words, as used herein, the instance may be configured according to the resource parameters. As an illustration, an instance, e.g., software associated with the instance, may detect an available amount of CPU capacity or RAM and, based at least in part on the detection, adjust one or more parameters that may control the software's performance, availability, etc. Numerous examples of how an instance may be configured according to its resource parameters are provided in certain embodiments herein.

Different occurrences in an execution environment may trigger configuration of an instance. For example, an instance may be configured in association with its creation or launching by a server computer hosting the instance. During such creation or launching, an operating system in the instance may adjust its configuration based on the resource parameters as part of its initial startup process. Other examples of triggers for configuration include, but are not limited to, installation of software and changes in computing resources available to implement the software associated with an instance. For example, the utilization of an increased number of software applications, hardware performance issues, the addition or removal of hardware, etc., may affect the available computing resources for an instance. In certain embodiments, such occurrences may be monitored and, upon their occurrence, an instance may be reconfigured to account for the changes in the execution environment.

The above examples and descriptions are non-limiting. Many more examples and descriptions may exist in other embodiments, some of which are provided below.

System Overview

FIG. 1 illustrates an example computing environment 100 for configuring instances according to resource parameters associated with the instance, in one illustrative embodiment. An instance may include an operating system when the instance is created or launched. One or more software applications may be added to the instance, e.g., via installation of the software applications. The operating system and the software applications associated with the instance may be configured based on the available computing resources available to the instance. Such processes, among others, may be provided by the example computing environment 100.

The example computing environment 100 may include, but is not limited to, one or more instance host devices 110, one or more instance host selection devices 170, one or more service provider devices 180, and one or more user devices 104. Each of these devices may communicate with one another via one or more networks 105 to implement the features described herein. For example, an instance host device 110 may be selected by an instance host selection device 170, e.g., via a selection application 176 executed in a memory 174, to host an instance that may be requested by a user 181 utilizing a service provider device 180. The instance host device 110 may provide content, information, etc., to users 102 in association with software running on the instance host device 110.

As used herein, the term "device" may refer to any computing component that includes one or more processors that can be configured to execute computer-readable, computer-implemented, or computer-executable instructions. Example devices can include personal computers, server computers, server farms, digital assistants, smart phones, personal digital assistants, digital tablets, Internet appliances, application-specific circuits, microcontrollers, minicomputers, transceivers, or customer premise equipment such as set-top boxes, kiosks, or other processor-based devices. The execution of suitable computer-implemented instructions by one or more processors associated with various devices may form special purpose computers or other particular machines that may facilitate optimized configuration of software as described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program may be configured to access, including signals downloaded through the Internet or other networks. For example, distribution of software may be downloaded via the Internet.

The one or more networks 105 may include any number of wired or wireless networks that can enable various computing devices in the example computing environment 100 to communicate with one another. In other embodiments, other networks, intranets, or combinations of different types of networks may be used including, but not limited to, the Internet, intranets, cable networks, cellular networks, landline-based networks, or other communication mediums connecting multiple computing devices to one another. Other embodiments may not involve a network and may, for example, provide features on a single device or on devices that are directly connected to one another, e.g., the instance host device 110 may be directly connected to the instance host selection device 170.

The devices illustrated in FIG. 1 may include one or more processors configured to communicate with one or more memory devices and various other components or devices. For example, the instance host device 110 may include one or more processors 112 that are configured to communicate with one or more memory or memory devices 130, one or more input/output (IO) devices 114, storage 116, one or more communication connections 118, and one or more data stores 120. The processor 112 may be implemented as appropriate in hardware, software, firmware, or combinations thereof. The processors 172 and 182 associated with the instance host selection device 170 and the service provider device 180, respectively, may be the same or at least similar to the processor 112 in one embodiment.

The memory 130 may store program instructions that are loadable and executable on the processor 112, as well as data generated during the execution of these programs. Depending on the configuration and type of instance host device 110, the memory 130 may be volatile, such as random access memory (RAM), and/or non-volatile, such as read-only memory (ROM), flash memory, etc. The memory 174 and 184 associated with the instance host selection device 170 and the service provider device 180, respectively, may be the same or at least similar to the memory 130 in one embodiment.

The storage 116 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 130 may include multiple different types of memory, such as static random access memory (SRAM), dynamic random access memory (DRAM), or ROM.

The memory 130 and the storage 116, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The one or more communication connections 118 may allow the instance host device 110 to communicate with other devices, e.g., user devices 104, databases, user terminals, and various other devices that may exist on the one or more networks 105. The IO devices 114 may enable a user to interact with the instance host device 110. Such IO devices may include, but are not limited to, a keyboard, a mouse, a pen, a voice input device, a touch input device, a display, a camera or imaging device, speakers, or a printer.

The one or more data stores 120 may store lists, arrays, databases, flat files, etc. In some implementations, the data store 120 may be stored in memory external to the instance host device 110 but accessible via the one or more networks 105, such as with a cloud storage service. The data stores 120 may store resource parameters and various other information that may be utilized to configure an instance with which the data stores may be associated. In one embodiment, each instance may have a data store that stores resource parameters associated with the instance.

The memory 130 may also include an operating system (O/S) 132, one or more instances 150, and various software applications and/or modules that may implement the configuration of software applications according to their execution environment. Example modules may include a configuration agent 154, which may run in an instance 150, and an instance manager 134, which may include a resource parameters identification module 136 and a resource parameters store module 140. Each of these modules may be implemented as individual modules that provide specific functionality associated with configuring software applications. Alternatively, one or more of the modules may perform all or at least some of the functionality associated with the other modules.

The instance manager 134 may create or launch an instance 150 based on the relevant resource parameters identified by the resource parameters identification module 136, as will be discussed below. The creation or launching may make available to the instance 150 a capacity of resources in a distributed computing environment (or other computing environment) that may be commensurate with the type of instance 150 requested. In one embodiment, the instance 150 may include an operating system when it is created. The operating system may configure itself based on the relevant resource parameters stored in the instance 150, e.g., by the resource parameters store module 140. Examples of the various types of configurations will be described below. Similarly, one or more software applications, when installed and/or initiated in association with the instance, may also be configured based on the resource parameters associated with the instance. According to certain embodiments, such software may be configured by a configuration agent 154 which may facilitate the configuration of software in an instance 150, as will be discussed in greater detail below. In some embodiments, an instance may include an operating system as well as software applications when it is created.

The instance manager 134 may also facilitate the dissemination of information to other devices, such as the service provider device 180 or the user devices 104. For example, the instance manager 130 may store information in an instance. When a service provider device, for example, requires information, such as the Internet Protocol (IP) address or the resource parameters used to configure an instance, the service provider device may access and retrieve the stored information. In one embodiment, the users 181 may perform the information retrieval by utilizing one or more service provider applications 186 stored in a memory 184 at the service provider device 182.

The instance manager 134 may receive requests from the instance host selection device 170 to host one or more instances 150. Selection of an instance host device 110 may be based on various criteria, such as, but not limited to, the capacities of computing resources available to the instance host device 110. If sufficient capacities exist for hosting the type of instance desired, then the instance host device 110 may host the instance 150 per the request received by the instance manager 134, according to one embodiment.

In addition to communicating with the various devices on the network 105, the instance manager 134 may also perform various management functions for the instance host device 110. For example, the instance manager 134 may monitor the computing environment in which an instance 150 runs for changes that may occur in the computing environment, such as changes in utilization of central processing units (CPUs), the installation of additional hardware and/or software, outages of computer servers or other devices, or other occurrences in a computing environment. Information associated with such occurrences may be stored in the instance 150 by the resource parameters store module 140 for use by software associated with the instance to reconfigure the software.

The resource parameters identification module 136 may identify resource parameters associated with various types of instances 150. An example type of an instance 150 may include a description of the instance associated with different capacities of computing resources, as will be discussed in greater detail below. The resource parameters identification module 136 may identify resource parameters from various sources in the network 105. In one example, resource parameters may be stored at a central database server (not shown), which may include predetermined information (e.g., before an instance is created and launched) about computing resources available in a distributed computing environment. Resource parameters may also include various other information that may not be predetermined but may be obtained in real-time from a server computer hosting the instance 150.

The user devices 104 may include a processor 142, which may be configured to process computer-executable instructions in a memory 144. The memory 144 may include one or more user applications 146 that may be utilized by a user 102 to interact with content, information, etc., provided by the instance host device 110. Example user applications 146 may include a web browser for presenting content to a user 102 or a client-side application that may interact with a server-side application for exchanging content between the user devices 104 and the instance host device 110. A user application 146 may also include an authentication program or module for facilitating authentication of a user 102 at the instance host device 110.

Distinctions drawn herein between the user devices 104 and service provider devices 180 may not exist in some embodiments. In these embodiments, a user 102 may utilize a user device 104 to perform each of the functions described above in association with the service provider device 180. For example, the user device 104 may also request instances, provide user account credentials, and interact with content, information, etc., provided by the instance host device 110.

The above examples are not meant to be limiting. Many more examples related to configuring various types of instances and the software therein may exist in other embodiments. The software, such as operating systems and software applications, may modify any number of its functions based on resource parameters associated with an instance in which the software runs. In certain embodiments, configuring an instance may refer to configuring an operating system and/or a software application in the instance. While various functions are described above with respect to particular devices, it is understood that these functions may be distributed in many ways across the devices. For example, the functionality provided by the instance host device 110 may be provided at least in part by the instance host selection device 170.

Figure 2:
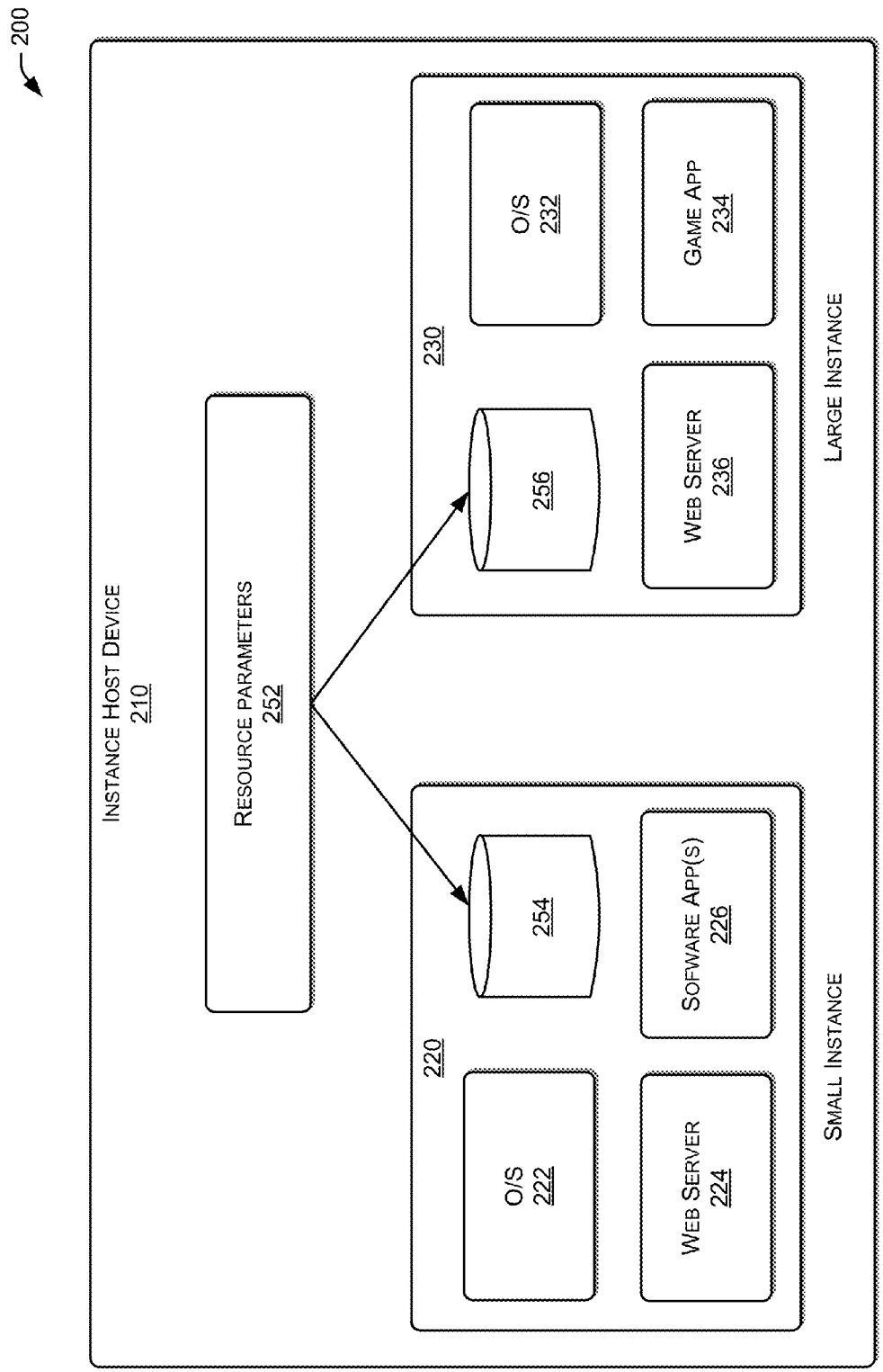
FIG. 2 illustrates an example block diagram for configuring software in different types of instances based on resource parameters associated with the instances, according to one embodiment of the disclosure.

FIG. 2 illustrates an example schematic diagram for configuring software in different types of instances based on resource parameters associated with the instances, in one embodiment. As indicated by the arrows in FIG. 2, "small" instance 220 and "large" instance 230 in the instance host device 210 may receive all or at least a portion of resource parameters 252 stored in a data store 120 as illustrated in FIG. 1, in one embodiment. Thus, the portion of resource parameters 252 received by the "small" instance 220 and/or the "large" instance 230 may be the same or different from resource parameters 252. Additionally, the portion of resource parameters 252 stored in the "small" instance 220 may be the same or different from the portion of resource parameters stored in the "large" instance 230, hence resource parameters 254 for "small" instance 220 and resource parameters 256 for "large" instance 230. Examples of resource parameters 252 may include, but are not limited to, information associated with CPU, RAM, hard disk, type of hardware platform (e.g., 32-bit, 64-bit), bandwidth, disk input/output operations per second (IOPS) (such as whether a spinning disk or a solid state drive (SSD) disk is being used), network connectivity (such as connections to 10 gigabit uplinks or to a shared 1 gigabyte top of a rack switch), maximum transmission unit (MTU) of a data packet, other network settings, and various other information associated with computing resources available in a distributed computing environment or other computing environment.

Resource parameters may be stored in various formats. In one embodiment, the resource parameters may be stored as one or more text files that may include one or more delimiters that may assist program code with parsing information from the resource parameters. Various other formats and techniques for obtaining resource parameters in such formats may exist in other embodiments.

As described, resource parameters may be determined from predetermined information, e.g., before an instance is created, or it may be determined from real-time information associated with a server computer on which an instance associated with the resource parameters may run, as non-limiting examples. There may be, in certain embodiments, different types of resource parameters. In one example, a different resource parameters type may exist for each different distributed computing environment, each of which may include various types of instances. Each type of instance may utilize different amounts of capacity of available computing resources. Each configuration of computing resources may be available in different sizes, such as large resources, consisting of numerous processors, large amounts of memory, and/or large storage capacity (e.g., "large" instance 230), and small resources consisting of relatively few processors, a relatively small amount of memory, and/or a relatively small storage capacity (e.g., "small" instance 220). Such capacities may be allocated for an instance in terms of one or more slots. A slot may be referred to as a virtual unit of capacity for CPU, RAM, hard disk, bandwidth, network connectivity, or other computing resources. To provide additional capacities of computing resources, slots may be combined. For example, one slot may be utilized to provide a small amount of computing resources for the "small" instance 220. Five slots may be utilized, however, to provide a large amount of computing resources for the "large" instance 230, in one example. The resource parameters associated with the instances 220 and 230 may include information identifying such computing resources and their respective capacities. As will be described below, such information may be accessed by software in the instances 220 and 230 and utilized to configure the software.

As an example, a request to create a "small" instance type 220 for running a web server 224 may be received from a user utilizing a service provider device (not shown). In response to the request, the instance 220 may identify resource parameters associated with the instance type, e.g., via the resource parameters identification module 136 in FIG. 1. In one embodiment, a resource parameters identification module 136 may specify various computer arguments (e.g., pieces of data provided as inputs into a function or subroutine), in addition to instance type, to select the resource parameters for the instance 220. Such arguments may include, but are not limited to, the type of operating system 222, the type of the web server 224 (e.g., if provided or known when the instance is requested), or more generally the type of software applications 226 running in the instance, an indication of how the instance will be utilized, an identification of the service provider or user requesting the instance and software, a geographical location of the service provider or user, and various other information associated with the instance. Such arguments may determine which resource parameters are selected. For example, resource parameters selected based at least in part on the type of software associated with an instance may be different from resource parameters selected based on the service provider that requested the instance. As an example, when a type of software is specified as an argument to the identification module 136, resource parameters associated with computing resources that are historically associated with implementing the software may be provided. Such information may be stored in one or more system or activity logs, other files, databases, etc. For example, if the type of software is related to computer networking, resource parameters associated with network connectivity, bandwidth, and other computer networking related resource parameters may be selected.

Returning to the present example, the selected resource parameters 252 may be stored in instance 220 as resource parameters 254, e.g., via the resource parameters store module 140. The resource parameters 254 may include at least a portion of the resource parameters 252 based on the selection parameters for identifying resource parameters associated with the requested instance, as described above. In one embodiment, the resource parameters 254 may be the same, a subset, or a derivation of the resource parameters 252. A capacity of the computing resources in the resource parameters 252, however, may be specified commensurate with the requested "small" instance 220.

The instance 220 may be created, e.g., by the instance manager 134 in FIG. 1. In association with creating the instance, the operating system 222 may detect that it is associated with a "small" instance by analyzing the resource parameters 254. The operating system 222 may configure itself so that it performs optimally based on the resource parameters 254. For example, the operating system 222 may adjust the maximum transmission unit (MTU) size for sending packets in a network based on the network conditions associated with an instance, such as available bandwidth of the server hosting the instance, percent utilization of a network interface card (NIC), and network latency, as non-limiting examples. For example, upon detecting a relatively high bandwidth, the operating system 222 may increase the MTU size for sending data packets in a network, whereas the operating system 222 may decrease the MTU size for sending data packets in a network upon detecting a relatively low bandwidth.

As another example, the operating system 222 may configure itself to adjust a number of allowable processes that may be performed by the web server 224, the one or more software applications 226, or other software applications (not shown) that may run in the instance 220. For example, the operating system 222 may decrease a maximum number of threads that may be spawned by the software applications 226, a maximum number of concurrent web connections that may be received by the web server 224, a maximum number of database connections that may be received by a database server (not shown), as non-limiting examples, upon detecting that the instance 220 is a "small" instance, thereby having a small amount of computing resources available. The operating system may have increased the number of allowable processes if it detected that it was running in a "large" instance, for example.

As another example, in association with installing or initiating the web server 224, the web server 224 may also be configured based on the resource parameters 254. For example, the web server 224 may update a parameter in its configuration to activate utilization of a less computing resource-intensive server-side function upon detecting that it is running in a "small" instance 220, with lower capacities of the computing resources than a "large" instance type for which a more resource-intensive server-side function that provides richer content to users may be used. Depending on the function activated, a type and amount of content provided by the web server 224 (or other software application) may be adjusted to optimize utilization of the available computing resources, e.g., such that rich content is not delivered when the available resources may struggle or fail to communicate the content.

In certain embodiments, the instance 220 may include a configuration agent, such as the configuration agent 154 illustrated in FIG. 1, which may configure the operating system 222, the web server 224, the software applications 226, or other software in the instance 220.

Also in association with creating an instance, information associated with the instance may be communicated from the instance host device 210 to a service provider device requesting the instance, in one embodiment. In one embodiment, such information may be based on a request from a service provider device or other device. For example, in response to a request for a network location of the instance 220, the service provider device may send an IP address associated with the instance 220, the resource parameters 254 used to configure the instance 220, as well as other information related to the instance 220. A service provider utilizing the service provider device may configure the web server 224 to have an IP address equivalent to the IP address returned from the instance host device 210. An end user may specify the IP address in a web browser, for example, at a user device (not shown) to gain access to software associated with the instance 220. Numerous other examples involving different types of requested information, content, data, etc., may exist in other embodiments.

In certain embodiments, software associated with instances may be reconfigured. In one embodiment, software may be reconfigured based on changes in an execution environment to which the software may belong. An example of such reconfiguration may be as follows. Additional software, such as software applications 226, may be installed in the instance 220. As a result of the installations and subsequent use of the software applications 226, CPU utilization at the host instance device 210 may increase. Such an increase may be detected by the host instance device 210, e.g., an instance manager, such as instance manager 134 in FIG. 1, in one embodiment. For example, the instance manager may periodically input an operating system 222 command, utilize other program code, or utilize other techniques to determine the current CPU utilization of the instance host device 210. Information resulting from such commands, code, or techniques may update resource parameters that may be stored as resource parameters 252 and/or resource parameters 254, in some embodiments.

The instance manager may compare the CPU utilizations upon receiving the results from each request and, upon detecting variations in the CPU utilizations, may determine that a change event has occurred in the instance 220. In one embodiment, CPU utilizations that vary by a certain percentage for a certain duration of time, e.g., 10% for more than one hour, may signify a change event, instead of smaller percentage variations in CPU utilization, which may suggest more temporary increases in CPU utilization. If a change event has been determined in the present example, the operating system 222 and web server 224 may be reconfigured to optimize their performance based on the change in CPU utilization. For example, the operating system 222 may increase the maximum number of allowable concurrent web connections based on the decrease in CPU utilization. Such a reconfiguration may prevent the web server 224 from attempting to receive more web connections than the available computing resources may be able to provide, which, if granted, may further burden CPU utilization and other computing resources associated with the resource parameters 254. Numerous other examples of changes in an execution environment and reconfiguring an instance, and associated software based on such changes, may exist in other embodiments.

An instance 230 may be created and configured in a similar fashion to that described in association with the instance 220. For example, the resource parameters 252 may be accessed, and the identified resource parameters 256 may be stored in the "large" instance 230. In one embodiment, the resource parameters 256 may be the same as the resource parameters 254. In another embodiment, the resource parameters 254 and resource parameters 256 may differ based on the type of instance. For example, the instance 220 may provide a web server 224 for delivering static content to users, whereas the instance 230 may provide a game application 234 for delivering real-time content, information, etc., in association with a real-time game, which may require much greater computing resources than the web server 224 in "small" instance 220, hence the "large" instance 230 and a correspondingly different resource parameters 256. The web server 224 and the game application 234 may be optimized according to the computing resources available as indicated in the resource parameters 254 and 256, respectively.

Similar to that described above in association with the instance 220, the instance 230 may be created and configured. Because instance 230 is a "large" instance, larger capacities of computing resources may be available to the instance 230 than that available for the "small" instance 220. The resource parameters 256 may reflect such larger capacities. Upon creating the instance 230, the resource parameters 256 may be accessed and utilized by the operating system 232 to adjust its configuration so that the operating system 232 is optimized according to the computing resources available to the instance 230. For example, upon detecting that it is associated with a "large" instance type having a large amount of computing resources available, the operating system 232 may increase a maximum number of allowable processes. For example, the operating system 232 may increase a maximum number of threads that may be spawned by the game application 234, a maximum number of concurrent web connections that may be received by the web server 236, and a maximum number of database connections that may be received by a database server (not shown), as non-limiting examples. As discussed above, the operating system 222 of instance 220 may decrease the number of allowable processes when it detects that it is associated with a "small" instance.

The game application 234, upon being installed or initiated, may also access the resource parameters 256 and adjust its configuration to optimize its performance according to the computing resources available to the instance 230, as set forth in the resource parameters 256. For example, the game application 234 may enable a user of the game application 234 to enable 3-dimensional effects or more computing resource intensive features of the game application 234 upon detecting in the resource parameters the availability of a Graphics Processing Unit capable of processing game-intensive features.

The operating system 232 and game application 234 may also be reconfigured based on changes in the execution environment associated with instance 230, in similar fashion to that described in association with the instance 220.

As described above in association with instance 220, the instance 230 may include a configuration agent that may configure the operating system 232, the web server 236, the game application 234, and other software in the instance 230 or another instance.

The instance host device 210 may provide content, information, etc., to the user devices 204, which users may utilize to interact with the applications and databases in the instances 220 and 230. Communications between the user devices 204, the instance host device 210, and the service provider device 240 may occur via one or more networks, which are not shown in FIG. 2 for purposes of simplification.

Numerous examples may exist in other embodiments, each of which may illustrate the capability of configuring software applications to utilize resource capacities in their execution environment. Use of terms such as "small" and "large" in association with instance types are for purposes of illustration only and are not meant to be limiting. A service provider or user may specify any term, symbol, or representation of an amount of desired computing resource capacity for hosting its services, including specifying a capacity for each of the desired computing resources. Additionally, various resource parameters may be analyzed by software to determine configurations for the software. In the above examples, the resource parameters 254 and 256 are analyzed to determine such configurations. In other examples, the resource parameters 252, from which the resource parameters 254 and 256 may be determined, may be utilized to determine configurations for the software.

Figure 3:
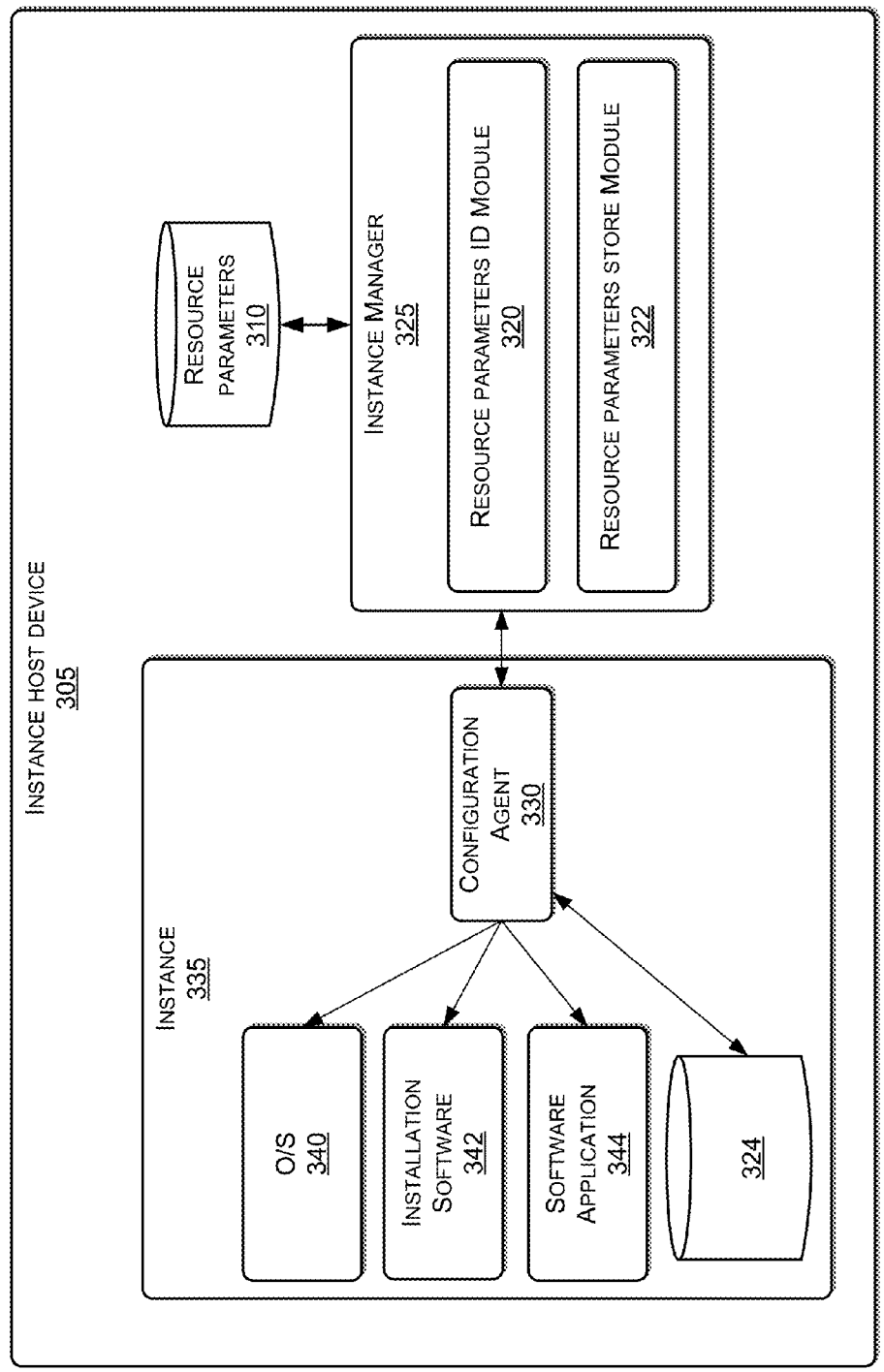
FIG. 3 illustrates an example program module that may be used to configure various software based on resource parameters identified for an instance in which the software runs, according to one embodiment of the disclosure.

FIG. 3 illustrates an example implementation of configuring software via a configuration agent in communication with the software. As used herein, a configuration agent may refer generally to a set of software components that adds specific functionality to a larger software application or operating system. An example of a configuration agent may include, but is not limited to, a plug-in module. In one example, a configuration agent 330 may be utilized by an operating system 340, installation software 342, software application 344 in the instance 335 (also referred to as "software 335"), as well as other software (not shown) to configure such software. In one embodiment, in association with creating an instance, the configuration agent 330 may configure an operating system, e.g., operating system 340, as well as other software associated with an instance, e.g., the installation software 342 and the software application 344. According to this embodiment, the configuration agent 330 may communicate with the instance manager 325 via an application programming interface (API) or a similar interface that may be used by program modules to communicate with other program modules. In other embodiments, the configuration agent 330 may not run in an instance but may be located within a module that generates the instance, for example, the instance manager 134. In yet other embodiments, the configuration agent 330 may be located on a device separate from the instance host device 305, in which case the configuration agent 330 may communicate with the software 335 via one or more networks (not shown).

Resource parameter processing modules 325, which may include a resource parameters identification module 320 and a resource parameters store module 322, may identify all or a portion of resource parameters 310, and store the resource parameters 310 as resource parameters 324, respectively, as described above. For purposes of explanation, it is assumed that the instance 335 is a "large" instance 335. Any number of instance types may be used in other examples.

An example of utilizing the configuration agent 330 to configure the software 335 may be as follows. In association with creating the instance 335, e.g., by the instance manager 325, the operating system 340 may communicate with the configuration agent 330 and instruct it to access the resource parameters 324 in the instance 335. In one example, such communication may occur via a program function call (or similar communication instruction) in which the software 335 may pass parameters to the configuration agent 330 that may direct the configuration agent's 330 behavior. For example, the software 335 may specify the location of the resource parameters 324 such that the configuration agent 330 may know how to access the resource parameters 324. The location may be a file path, an IP address, a website Uniform Resource Locator (URL) translatable to an IP address, a memory address, or other location-specific information.

In addition to locating the resource parameters, the software 335 may also specify a portion of the resource parameters 324 to retrieve, in certain embodiments. In this way, the resource parameters 324 may be filtered by the software 335 to provide only a portion of the resource parameters 324. For example, the software 335 may determine that only the CPU, RAM, and network connectivity resource parameter information are relevant to the configuration of the software 335 and may, therefore, instruct the configuration agent 330 to retrieve only this information. The software 335 may also provide the configuration agent 330 with one or more locations of the software's 335 configuration information and other information that may be used by the configuration agent 330 to update configurations for the software 335.

To update configurations for the software 335, according to a non-limiting example, the configuration agent 330 may parse relevant information associated with the configuration from the resource parameters 324, locate the configuration of the software 335 (e.g., in configuration files, databases, etc.), compare the values in the configuration with the parsed resource parameters, determine appropriate values for a new configuration based on the parsed resource parameters, and update the configuration with the appropriate values.

For example, the configuration agent 330 may update a configuration file accessed by the operating system 340 to change the maximum number of allowable concurrent web connections from 10,000 to 20,000 upon detecting that the operating system 340 is associated with a "large" instance type. Such detection may be accomplished by the configuration agent 330 analyzing information in the resource parameters 324. For example, upon determining that 2.0 gigahertz CPU processing capacity and 3.0 gigabytes of RAM exists in the resource parameters 324, the configuration agent 330 may determine that the software 335 exists in a "large" instance type. The configuration agent 330 may utilize the amount of CPU, RAM, and/or the type of the instance 300 (e.g., "large") to determine the optimal configuration for the maximum number of concurrent web connections, and an appropriate request for more or less may be issued, in one embodiment.

The optimal configuration may be determined in various ways. For example, the optimal configuration may be determined based on predetermined values that may, for example, be included in a matrix or table of information that may associate a configuration value with certain capacities of computing resources as identified in the resource parameters. For example, the table may include a certain number of rows that may include a description of types of instances and/or a capacity, or range of capacities, for various computing resources available in a computing environment. The columns may contain various configuration parameters that may be associated with various software. The intersection of the rows and columns may include a configuration value associated with the configuration parameter for a particular computing resource or type of instance. For example, in the above example in which the number of concurrent users was increased from 10,000 to 20,000, a table may include a row indicating a "large instance type" and a column indicating "maximum number of concurrent sessions." The intersection of the row and column, e.g., the optimal configuration value, may indicate that 20,000 concurrent users is the optimal configuration value for receiving a number of concurrent web sessions for a web server associated with a "large" instance type, in the present example. Configuration values may also exist for other configuration parameters, such as those discussed in the examples herein, and for other resource parameters, such as CPU and RAM, as well as for ranges of such resource parameters.

The optimal configuration value may also be determined using various other techniques, algorithms, logic, mathematical computations, etc., in other embodiments. A configuration value may be a number, term, amount of capacity, or other indicator that may cause the software to perform according to the configuration value when accessed by the software.

In some embodiments, instead of the configuration agent 330 configuring the software 335, the configuration agent 330 may provide resource parameters to the software 335 and/or optimal configuration values, and the software 335 may utilize such information to configure itself. The operating system 340 may use such information to configure its kernel, in one example. The configuration of the operating system's 340 kernel may be performed when the operating system 340 is being installed and/or being initiated in the instance 300. Similar to the operating system 340, the software application 344 may also be configured during its installation (e.g., via the installation software 342), during its initial startup, at which time the software application 344 may access its configuration information, or other opportunities in which the software application 344 may access its configuration information. As another example, the installation software 342 may communicate with the configuration agent 330 to configure software that is being installed by the installation software 342 based on the resource parameters, as described above.

The configuration agent 330 may monitor changes in the execution environment associated with the instance, or may receive an indication from the instance manager 134 that such a change has occurred. The indication from the instance manager 134 may trigger the configuration agent 330 to configure software in the manner described above, in one embodiment. The configuration agent 330 may also detect such changes by periodically accessing the resource parameters 324 and comparing current information in the resource parameters 324 to previous information in the resource parameters 324. Upon detecting changes in the resource parameters 324, the configuration agent 330 may configure the software 335 in the manner described above, in one embodiment. In this way, the software 335 may be configured in real-time. In some examples, the software 335 may require a stop and restart, for example, so that the software may access and adjust to its updated configuration.

The above example is only one non-limiting example. Many more examples that may involve fewer or more devices, different types of devices, and/or different types of resource parameters, configurations, etc., may exist in other embodiments. For example, the examples above refer to the configuration agent 330 configuring the software 335 or the software 335 configuring itself. In other examples, a different one or more software programs and/or modules may perform the configurations performed by the configuration agent 330 or the software 335. Additionally, numerous other opportunities for configuring the software 335, in addition to installation, initiation or startup, or detection of changes in the computing execution environment, may exist in other embodiments. Also, in other embodiments, the operating system 340, the installation software 342, and the software application 344 each may have their own program code (independent of the configuration agent 330) that may respectively configure these software, as described in association with the configuration agent 330.

Operational Overview

Figure 4:
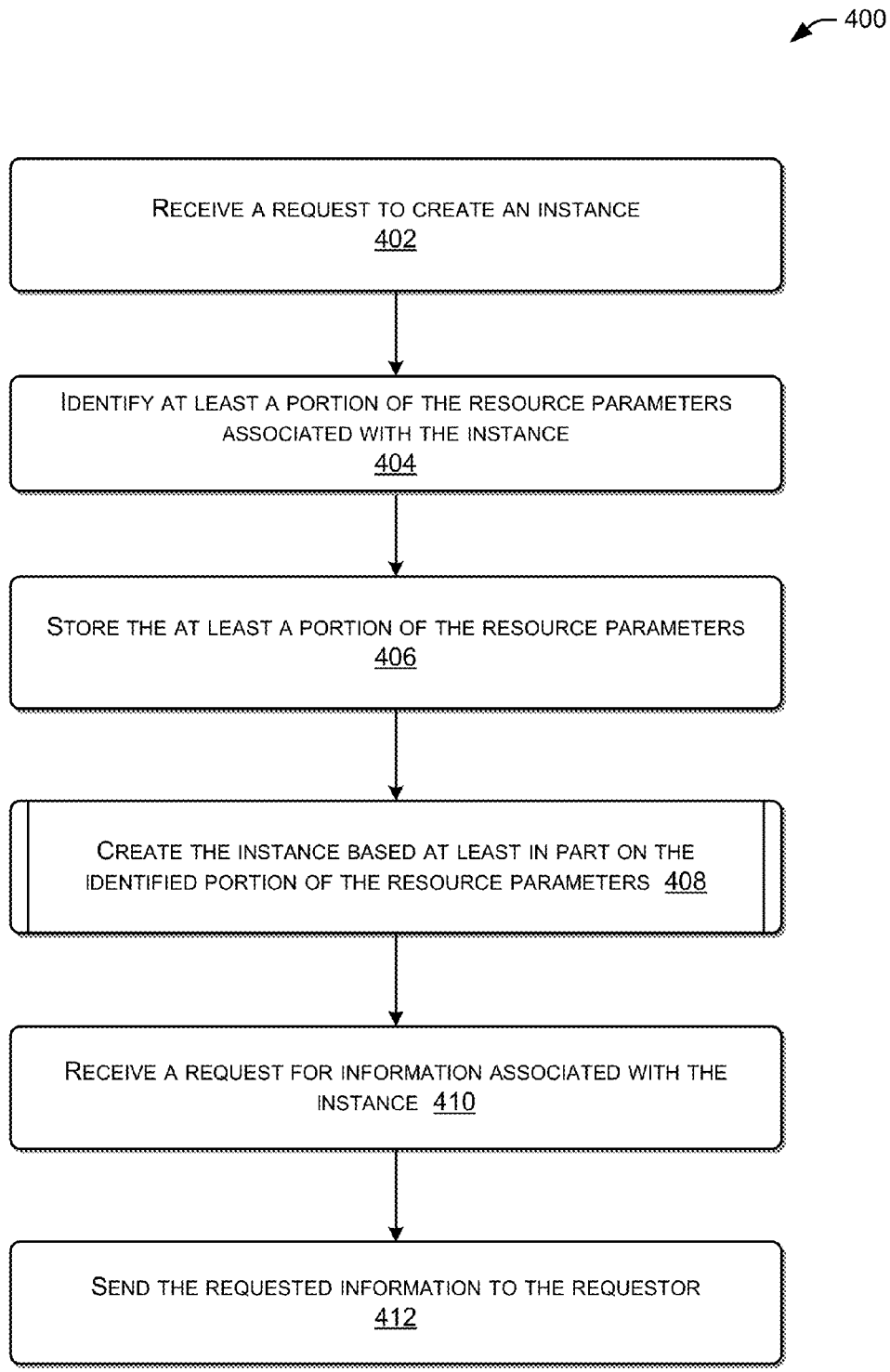
FIG. 4 illustrates an example flow diagram of a process for configuring software according to its execution environment, according to one embodiment of the disclosure.

FIG. 4 illustrates an example flow diagram 400 of a process for configuring software applications according to its execution environment, according to one embodiment of the disclosure. The example flow diagram 400 may be performed by the instance host device 110 in FIG. 1. At block 402, a request to create an instance may be received, e.g., by the instance manager 134. The request may include a type of the instance, which may vary according to the amount of computing resource capacity desired by the requestor of the instance, e.g., a service provider or other user utilizing a service provider device 180.

At least a portion of resource parameters may be identified for configuring the software, at block 404. As described, resource parameters may include, but are not limited to, information associated with capacities of computing resources available in a distributed computing environment or other computing environment for implementing software, such as operating systems and software applications. In certain embodiments, all or at least a portion of the resource parameters may be identified, based on various considerations, such as the type of instance, an indication of how the instance will be utilized, the type of software running in the instance, etc.

At block 406, at least a portion of the identified resource parameters may be stored, e.g., via the resource parameters store module 140, where it may be accessed by software associated with the created instance, e.g., via the configuration agent 330 in FIG. 3. The instance may be created or launched based on the identified resource parameters, at block 408. Such creation may make available to the instance a certain capacity of computing resources. Software running in the instance may optimize its performance according to these available computing resources, e.g., the execution environment.

At block 410, a request for information associated with the instance may be received, e.g., from the service provider device 180 or other device. The requested information may include an IP address and the resource parameters used to configure the instance, as non-limiting examples. The requested information may be sent to the device that requested the information, at block 412.

Figure 5:
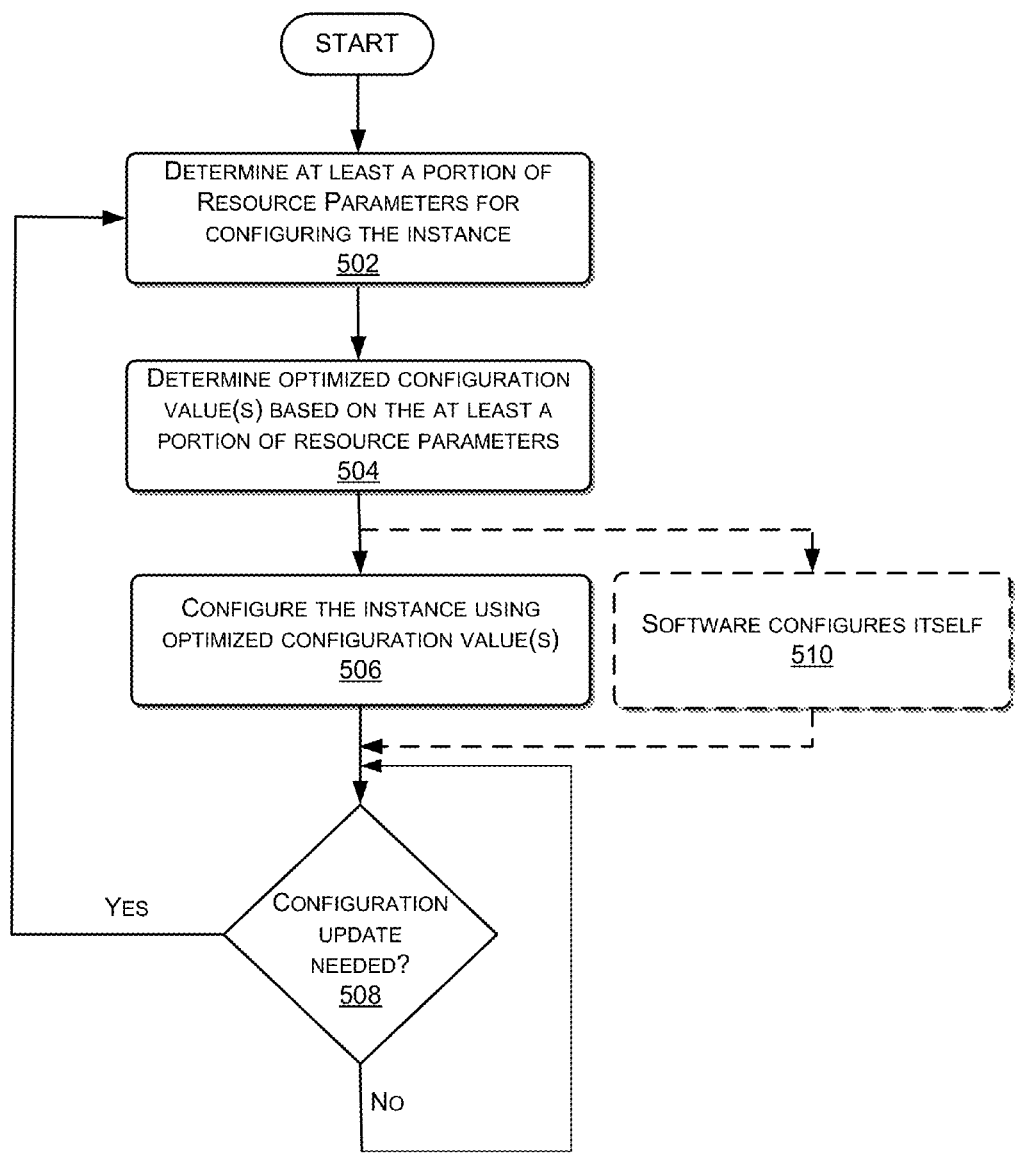
FIG. 5 illustrates an example flow diagram of a process for configuring an instance via a configuration agent, according to one embodiment of the disclosure.

FIG. 5 illustrates an example flow diagram of a process for configuring an instance via a configuration agent, according to one embodiment of the disclosure. As described herein, configuration of the instance may include configuring software in the instance, such as an operating system and one or more software applications running in the instance. In one embodiment, configuration of the instance may be performed by the configuration agent 330 in FIG. 3. The example flow diagram 500 may begin at block 502, where at least a portion of resource parameters for configuring an instance may be determined. In one embodiment, such a determination may be based on a request received from software in the instance, which may include various parameters that may be used to perform the configuration, such as, but not limited to, the location of the resource parameters, relevant portions of the resource parameters (e.g., certain computing resources) to utilize in performing the configuration, and the location of configuration files, databases, etc., associated with the requestor, e.g., software 335, requesting the configuration. Various other details about how to perform an update of such configuration files, databases, etc., may also be known.

At block 504, an optimized configuration value that may be used to configure the instance may be determined, at block 504. As described above, various techniques may be used to determine the optimized configuration value, such as, but not limited to, cross-referencing the value in a matrix associating resource parameters with respective capacities. Software in the instance may be configured using the optimized configuration value (e.g., via the configuration agent 330) at block 506. According to some configurations, the software may configure itself, at block 510, which will be discussed in greater detail in association with FIG. 6.

At block 508, a determination may be made whether a configuration update is required. As an example, a configuration update may be required in response to changes in available computing resources associated with an instance, which may be detected by the configuration agent 330 or the instance manager 134, according to various embodiments. Example change events that may impact computing resources may include, but are not limited to, an increased number of software applications, hardware performance issues, or the addition or removal of hardware. If a configuration update is required, processing may return to block 502, where at least a portion of resource parameters may be determined for configuring the instance. By configuring the instance based on changes in the computing environment, software in the instance may be optimized according to the changes in computing resources.

Figure 6:
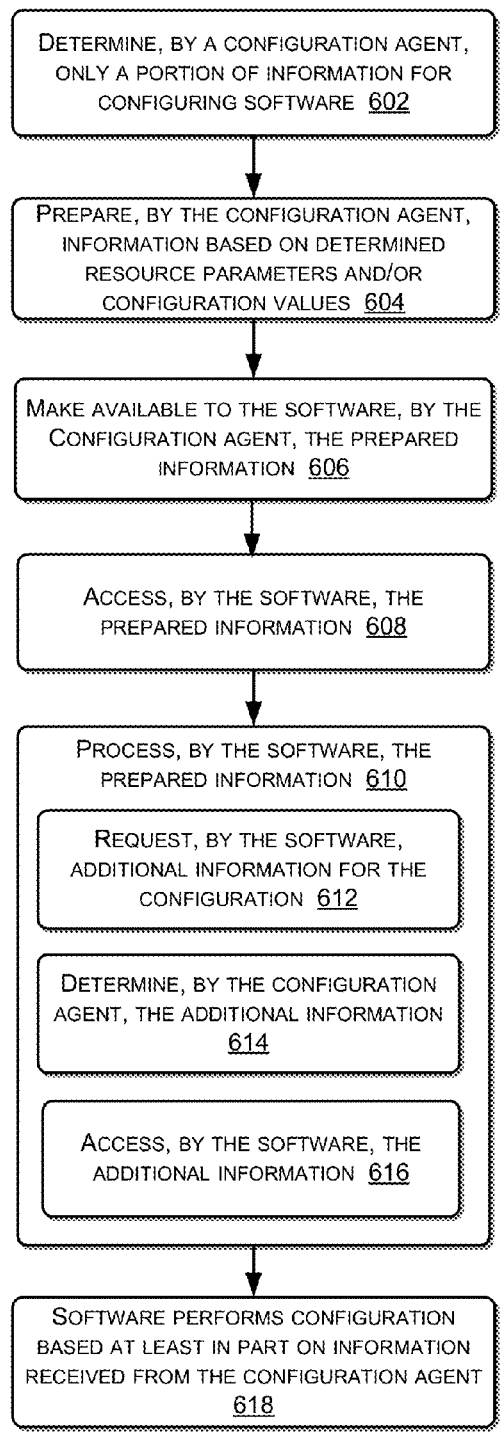
FIG. 6 illustrates an example flow diagram of interaction between a configuration agent and software in association with configuring the software, according to one embodiment of the disclosure.

FIG. 6 illustrates an example flow diagram 600 of a configuration agent communicating with software to configure the software, in one embodiment of the disclosure. In one embodiment, the configuration agent may be the configuration agent 330 in FIG. 3. The flow diagram 600 may begin at block 602, where only a portion of information for configuring software may be determined. The remaining portion of information may not be determinable by the configuration agent, according to one example. The configuration agent may not be able to determine at least a portion of the information (or none of the information according to some embodiments) for a number of reasons. For example, the configuration agent may not be familiar with a particular version of the software, which may be associated with parameters, files, settings, etc., that may be unknown to the configuration agent. As another example, a configuration agent may be unfamiliar with a location of a file, database, etc., that may require updating to facilitate configuration of the software. The configuration agent may be unable to configure the software for various other reasons in other examples.

At block 604, the configuration agent may prepare information that may be used to configure the software. For example, the configuration agent may determine at least a portion of information associated with resource parameters and/or configuration values (e.g., as determined for the instance at blocks 502 and 504 of FIG. 5). The determined portion of the resource parameters and/or configuration values may represent the relevant information to be used in configuring the software, in one example. After the information is prepared, it may be made available at block 606.

The software may access the information, at block 608, and process the information, at block 610. Such processing may include the software requesting additional information for use in configuring itself. In one example, the software may request the additional information after determining that the software requires additional information to perform its configuration. The configuration agent may determine the additional information, at block 614, for example by determining additional resource parameters or configuration values based on information that may be provided in the request from the software. The software may access the additional information determined by the configuration agent, at block 616. The software may use all or a portion of the information made available by the configuration module to perform its configuration, at block 618.

In some embodiments, all or a portion of the functionality described herein may be performed by one or more software programs and/or modules. For example, software, such as an operating system or software application, may configure itself without communicating with a configuration agent as described above.

The operations and processes described and shown above may be carried out or performed in any suitable order as desired in various implementations. Additionally, in certain implementations, at least a portion of the operations may be carried out in parallel. Furthermore, in certain implementations, less than or more than the operations described above may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable code or program instructions. Likewise, some blocks of the block diagrams and flow diagrams may not necessarily need to be performed in the order presented, or may not necessarily need to be performed at all, according to some implementations.

These computer-executable code or program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. One or more non-transitory computer-readable media storing computer-executable instructions that, when executed by at least one processor, configure the at least one processor to perform operations comprising:
   receiving a request to create an instance that includes an operating system and a software application; and
   creating the instance, wherein creating the instance comprises:
      detecting, by at least one of the operating system or the software, a first set of resource parameters for the instance, wherein the first set of resource parameters include information associated with one or more servers in a distributed computing environment to be allocated to host the instance; and
      after detecting the first set of resource parameters, configuring the operating system and the software application based at least in part on the first set of resource parameters;
   receiving a request for modification of the instance;
   determining a second set of resource parameters based at least in part on the modification; and
   reconfiguring the operating system and the software application based at least in part on the second set of resource parameters, wherein reconfiguring the operating system and the software application comprises at least one of: (i) modifying a number of allowable concurrent connections to a web server, or (ii) modifying a number of allowable threads spawned by the operating system or the software application.

2. The one or more non-transitory computer-readable media of claim 1, the at least one processor further configured to execute the computer-executable instructions to perform operations comprising:
   determining a portion of the second set of resource parameters for configuring a second software application running in the instance; and
   configuring the second software application based at least in part on the portion of the second set of resource parameters.

3. The one or more non-transitory computer-readable media of claim 1, wherein the configuring modifies the operating system and the software application to perform according to a respective capacity of the one or more servers.

4. The one or more non-transitory computer-readable media of claim 1, wherein the resource parameters comprise information associated with at least one of a central processing unit (CPU), a random access memory (RAM), a hard disk, a computer hardware platform, network connectivity, disk input/output operations per second (IOPS), a bandwidth, or one or more network settings.

5. The one or more non-transitory computer-readable media of claim 1, wherein reconfiguring the operating system and the software application further comprises at least one of modifying one or more network settings, or modifying at least one of a type or an amount of content output by the operating system or the software application.

6. The one or more non-transitory computer-readable media of claim 1, wherein the software application comprises a game application and the resource parameters comprise an indication of a Graphics Processing Unit (GPU), wherein configuring the operating system and the software application based at least in part on the detected resource parameters comprises configuring the game application to enable 3-dimensional effects processed by the GPU.

7. A system comprising:
   at least one memory configured to store computer-executable instructions; and
   at least one processor configured to access the at least one memory and execute the computer-executable instructions to:
      receive a request to configure software associated with an instance;
      detect, by the software, resource parameters for configuring the software based at least in part on the request, the resource parameters comprising information associated with a respective capacity of one or more computing resources to be utilized by the instance;
      after detecting the resource parameters, configure the software based at least in part on the detected resource parameters;
      determine that the resource parameters have changed based at least in part on a received request for modification of the instance; and
      reconfigure the software based at least in part on the determination that the resource parameters have changed, wherein reconfiguring the software comprises at least one of: (i) modifying a number of allowable concurrent connections to a web server, or (ii) modifying a number of allowable threads spawned by an operating system or the software.

8. The system of claim 7, wherein the resource parameters comprise information associated with at least one of a central processing unit (CPU), a random access memory (RAM), a hard disk, a computer hardware platform, network connectivity, disk input/output operations per second (IOPS), a bandwidth, or one or more network settings.

9. The system of claim 7, wherein the software comprises an operating system, wherein the operating system is configured based at least in part on a first portion of the resource parameters, and wherein the at least one processor is further configured to:
   detect, by the software, a second portion of resource parameters for configuring a software application associated with the instance; and
   after detecting the second portion of resource parameters, configure the software application based at least in part on the second portion.

10. The system of claim 7, wherein determining the resource parameters is based at least in part on at least one of a type of the software, an indication of how the instance will be utilized, or information associated with a user of the software.

11. The system of claim 7, wherein the software is configured in association with at least one of installing the software, initiating the software, or detecting a change associated with the one or more computing resources.

12. The system of claim 7, wherein reconfiguring the software comprises modifying one or more network settings.

13. The system of claim 7, wherein reconfiguring the software comprises modifying at least one of a type of content output by the software or an amount of the content output by the software.

14. The system of claim 7, wherein the resource parameters correspond to a type of the instance, and wherein the instance is created based at least in part on the type of the instance.

15. The system of claim 7, wherein the software comprises an operating system, and wherein the operating system is configured in association with creating the instance.

16. The system of claim 7, wherein the software comprises an operating system and one or more software applications.

17. A method comprising:
under control of one or more computer systems configured with executable instructions,
receiving a request to create a type of instance that includes software;
detecting, by the software, resource parameters associated with the instance, wherein the resource parameters include information associated with a respective capacity of one or more computing resources to be utilized by the instance; and
after detecting the resource parameters, creating the instance based at least in part on at least a portion of the detected resource parameters, wherein the instance includes an operating system and a software application;
receive a request for modification of the instance;
determining that the resource parameters associated with the instance have changed according to the request; and
configuring the operating system and the software application based at least in part on the determination that the resource parameters have changed, wherein configuring the operating system and the software application comprises at least one of: (i) modifying a number of allowable concurrent connections to a web server, or (ii) modifying a number of allowable threads spawned by the operating system or the software application.

18. The method of claim 17, further comprising storing the resource parameters.

19. The method of claim 17, further comprising:
monitoring the one or more computing resources; and
upon detecting a change in at least one of performance associated with the one or more computing resources or utilization of the one or more computing resources, updating the stored resource parameters with information associated with the change.

20. The method of claim 17, wherein the software is an operating system, wherein the operating system configures its kernel based on the resource parameters.

21. A method comprising:
detecting, by software associated with a computing system comprising one or more computers, at least a portion of resource parameters for configuring an instance comprising the software, wherein the resource parameters comprise information associated with a respective capacity of one or more computing resources to be utilized by the instance; and
configuring, by the software, the instance based at least in part on the detected at least a portion of resource parameters, wherein the configuring modifies the software in the instance to perform according to the respective capacity of the one or more computing resources;
receiving a request for modification of the instance;
determining, based at least in part on the request, that the resource parameters have changed; and
reconfiguring the instance based at least in part on the determination that the resource parameters have changed, wherein configuring the operating system and the software application comprises at least one of: (i) modifying a number of allowable concurrent connections to a web server, or (ii) modifying a number of allowable threads spawned by the operating system or the software application.

22. The method of claim 21, wherein the software includes an operating system, the method further comprising:
detecting, by the software, at least a second portion of resource parameters for configuring a software application associated with the instance; and
after detecting the at least a second portion of resource parameters, configuring, by the software, the software application based at least in part on the at least a second portion.

23. The method of claim 21, wherein determining the at least a portion of resource parameters is based at least in part on at least one of a type of the instance, an indication of how the instance will be utilized, or information associated with a user of the instance.

24. The method of claim 21, further comprising receiving, from the software, a request to configure the software.

25. The method of claim 21, wherein the at least a portion of resource parameters comprises information associated with at least one of a central processing unit (CPU), a random access memory (RAM), a hard disk, a computer hardware platform, network connectivity, disk input/output operations per second (IOPS), a bandwidth, or one or more network settings.

26. The method of claim 21, wherein performing according to the respective capacity of the one or more computing resources further comprises at least one of modifying one or more network settings, or modifying at least one of a type of content output by the software or an amount of the content output by the software.

* * * * *